United States Patent
Fischer et al.

(10) Patent No.: US 8,220,596 B2
(45) Date of Patent: Jul. 17, 2012

(54) DISC BRAKE FOR A COMMERCIAL VEHICLE

(75) Inventors: Rudolf Fischer, Erding (DE); Ralf Vogedes, Wolfratshausen (DE); Markus Babicz, Allershausen (DE); Christian Raffin, Grasbrunn (DE); Michael Peschel, Eching (DE); Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 249 days.

(21) Appl. No.: 12/437,235

(22) Filed: May 7, 2009

(65) Prior Publication Data
US 2009/0272607 A1    Nov. 5, 2009

Related U.S. Application Data

(63) Continuation of application No. PCT/EP2007/009731, filed on Nov. 9, 2007.

(30) Foreign Application Priority Data

Nov. 9, 2006   (DE) .......................... 10 2006 053 183

(51) Int. Cl.
*F16D 65/14*   (2006.01)
(52) U.S. Cl. .................................... 188/73.44
(58) Field of Classification Search ............ 188/71.8, 188/73.44, 73.31, 73.1, 73.39, 73.42, 73.43–73.47
See application file for complete search history.

(56) References Cited

U.S. PATENT DOCUMENTS

| | | | | |
|---|---|---|---|---|
| 4,162,721 A | * | 7/1979 | Moriya | 188/73.38 |
| 4,311,219 A | | 1/1982 | Watanabe et al. | |
| 4,436,186 A | * | 3/1984 | Ritsema et al. | 188/71.8 |
| 4,465,164 A | * | 8/1984 | Anderson | 188/73.44 |
| 4,469,337 A | * | 9/1984 | Yokoi et al. | 188/73.44 |
| 4,630,713 A | | 12/1986 | Carre et al. | |
| 5,785,156 A | | 7/1998 | Warwick et al. | |

FOREIGN PATENT DOCUMENTS

| | | |
|---|---|---|
| DE | 29 46 336 A1 | 5/1980 |
| DE | 196 51 917 A1 | 6/1998 |
| DE | 100 04 178 A1 | 5/2001 |
| DE | 100 07 354 A1 | 8/2001 |

(Continued)

OTHER PUBLICATIONS

German Office Action dated Sep. 17, 2007 with an English translation (Twelve (12) pages).

(Continued)

*Primary Examiner* — Melanie Torres Williams
(74) *Attorney, Agent, or Firm* — Crowell & Moring LLP

(57) ABSTRACT

A disc brake, particularly for a commercial vehicle, includes a brake caliper, which is provided with a brake disc and fixed to a brake carrier by two fastening elements such that it can be axially displaced in relation to the brake disc. The fastening elements each include a guide spar, which is connected to the brake carrier in a fixed manner. For the axial displacement of the brake caliper, one of the guide spars is guided in a plain bearing designed as a movable bearing and the other in a plain bearing designed as fixed bearing such that the guide spar of the fixed bearing includes an elastically deformable section in the radial direction on the outer circumference. The associated bearing rests against the deformable section at least in some sections.

23 Claims, 3 Drawing Sheets

FOREIGN PATENT DOCUMENTS

| | | |
|---|---|---|
| DE | 102 45 027 A1 | 4/2004 |
| DE | 103 41 095 A1 | 4/2005 |
| EP | 0 468 696 A1 | 1/1992 |
| WO | WO 2004/038249 A1 | 5/2004 |
| WO | WO 2005/124179 A1 | 12/2005 |

OTHER PUBLICATIONS

International Search Report dated Feb. 7, 2008 with an English translation (Six (6) pages).

* cited by examiner

DISC BRAKE FOR A COMMERCIAL VEHICLE

CROSS-REFERENCE TO RELATED APPLICATIONS

This application is a continuation of PCT International Application No. PCT/EP2007/009731, filed Nov. 9, 2007, which claims priority under 35 U.S.C. §119 to German Patent Application No. DE 10 2006 053 183.3, filed Nov. 9, 2006, the entire disclosures of which are herein expressly incorporated by reference.

BACKGROUND AND SUMMARY OF THE INVENTION

The invention relates to a disc brake and, in particular, to a disc brake for a commercial vehicle having a caliper which straddles a brake disc and is fastened axially displaceably, in relation to the brake disc, to a brake carrier by two fastening elements. The fastening elements have, in each case, one guide spar which is connected fixedly to the brake carrier, one guide spar is guided in a plain bearing configured as a floating bearing and another is guided in a plain bearing configured as a fixed bearing, for the axial displaceability of the caliper.

In such disc brakes, which are also called "sliding caliper" disc brakes, the caliper is connected to a brake carrier on the vehicle side by the fastening elements.

Here, guide spars are usually connected to the brake carrier by being screwed, which guide spars are guided on the other side in sliding bearings of the caliper such that an axial displacement of the caliper with respect to the stationary brake carrier is possible. While one of the sliding bearings is configured as a fixed bearing with a small amount of sliding play, the other acts as a floating bearing, as a result of which, in particular, manufacturing tolerances are compensated for.

In addition to the guide spar, the fixed or locating bearing includes a guide sleeve, preferably made from brass, which is pressed fixedly into the caliper and is guided together with the caliper so as to slide on the guide spar.

Since, however, play-free sliding mounting between the guide spar and the guide sleeve cannot be realized in practice, the caliper remains radially movable to a certain extent under operating conditions, with the result that, in this case, rattling noise is produced in many cases, which is considered disruptive, above all in vehicles which are used for passenger transport.

Moreover, on account of the radial movability in the fixed bearing, deflection of the guide sleeve can occur, by way of which the operational security of the entire disc brake is impaired.

Irrespective of the type of sliding bearings, the fixed bearing has to be sealed in order to protect against corrosion and dirt. However, dirt particles nevertheless pass between the guide sleeve and the guide spar, which naturally impairs the sliding properties, in particular, of the guide sleeve which is composed of brass.

The invention is therefore based on providing a disc brake such that the wear and shaking resistance of the fixed bearing is improved with low structural and manufacturing outlay.

According to the invention, a disc brake includes a caliper which straddles a brake disc and is fastened axially displaceably, in relation to the brake disc, to a brake carrier by two fastening elements. The fastening elements have, in each case, one guide spar which is connected fixedly to the brake carrier, one guide spar is guided in a plain bearing configured as a floating bearing and another is guided in a plain bearing configured as a fixed bearing, for the axial displaceability of the caliper. The guide spar of the fixed bearing has, on an outer circumference, a radially elastically deformable section, against which the associated bearing bears at least in some sections.

A disc brake configured in this manner is distinguished, in particular, by the fact that the guide spar is always held under slight prestress with respect to the caliper. As a result, first rattling is prevented in the guide and, second, manufacturing tolerances can be compensated for without problems in the entire assembly.

There is provision according to one advantageous development of the invention to manufacture and to mount the radially elastically deformable section of the guide spar as a separate component. Here, this section is configured as a damping bush, having a metallic inner casing which serves as a carrier for an elastically deformable layer, for example rubber, which is pressed together with the metal bush.

Here, the caliper or its guide sleeve bears slidably as a sliding bearing against the elastic layer, it being possible for the sliding force which is to be applied to be set by the selection of the elastic material, but also by the dimensions, in particular of the diameter, which define the pressing forces.

If a correspondingly great braking moment is introduced, the elastic layer is compressed to such an extent that the sliding bearing also comes into contact with the guide spar outside the elastic layer. However, damage of the layer or the sleeve overall does not occur in this case.

The damping bush is preferably arranged on the guide spar with axial play. For simple mounting of the damping bush and likewise in order to set the axial play, a circumferential shoulder, against which the damping bush bears with an end side, is provided on the guide spar. The damping bush is secured against movement by a closure ring which is assigned to the other end side and is connected to the guide spar on the end side, to be precise on that end of the guide spar which faces away from the brake disc.

The sliding bearing region is usually sealed at that end of the guide spar which faces the brake disc by use of a folding bellows, which is fastened on one side to the guide spar and on the other side to the caliper.

According to one advantageous development of the invention, the damping bush has a progressive damping characteristic in the radial load direction, which progressive damping characteristic preferably differs over the part regions.

To this end, the damping bush can be provided, on the outside and/or inside, with webs which are arranged parallel to one another and at a spacing from one another and which in each case form lateral limits for grooves, the flanks of the webs opening into contact regions, on which the guide spar is supported or which bear against the guide sleeve.

At least one part of the webs may be thicker, wider, and/or at a different spacing from one another. The webs can extend axially, circumferentially or diagonally.

In the case of increased radial forces which occur as a result of operation, as occur, for example, when driving on damaged roads, the webs are compressed correspondingly, with the result that the damping bush stiffens abruptly. This produces a progression stage which leads to a noticeably improved damping characteristic, with the consequence that, even in these cases, rattling is largely avoided, as is produced by the guide sleeve and the guide spar striking one another.

This naturally contributes to an increase in the service life of the locating bearing, since the guide sleeve and the guide spar are loaded to a less pronounced extent.

The widths of the inner grooves which are equally large or different, depending on the requirement and design, are preferably narrower than the grooves on the outside. In the case of corresponding radial loading, the inner webs, which are formed by the grooves, can be deformed to such an extent that, together with the grooves, they form a closed or largely closed surface area in the region of the active radial forces.

Otherwise, the grooves are preferably of an arcuate design in cross section, while the webs can be adapted with their contact faces to the curvature of the guide sleeve or the guide spar.

For additional damping, that is to say prevention of the production of rattling noise, there is provision according to a further aspect of the invention, to arrange a damping ring in the region of the folding bellows. The damping ring is connected to the folding bellows on the inside of the latter and engages around the guide spar.

The damping bush and the damping ring can be installed without problems into disc brakes which are in use, to which end only the guide spar and, optionally, the inner folding bellows have to be exchanged. This expediently takes place during a brake pad change.

As mentioned, the damping bush is mounted on the guide spar with axial play. Here, the play can be determined by an adjustment of the closure ring, depending on how the latter is positioned on the guide spar. The axial play of the damping bush preferably corresponds to half the air play, in order to always ensure the freedom of movement of a reaction-side brake pad.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show a part of a disc brake, in particular for a commercial vehicle, having a caliper 1 which straddles a brake disc (not shown) and is fastened axially displaceably, in relation to the brake disc, to a brake carrier 5 by two fastening elements (only one of which is shown).

Here, the fastening elements have, in each case, a guide spar 3 which is connected fixedly to the brake carrier 5 and of which one is guided in a sliding bearing which is configured as a floating bearing and the other is guided in a sliding bearing which is configured as a fixed bearing, for the axial displaceability of the caliper 1. The region of the fixed bearing is shown in the exemplary embodiment.

Figure 1:
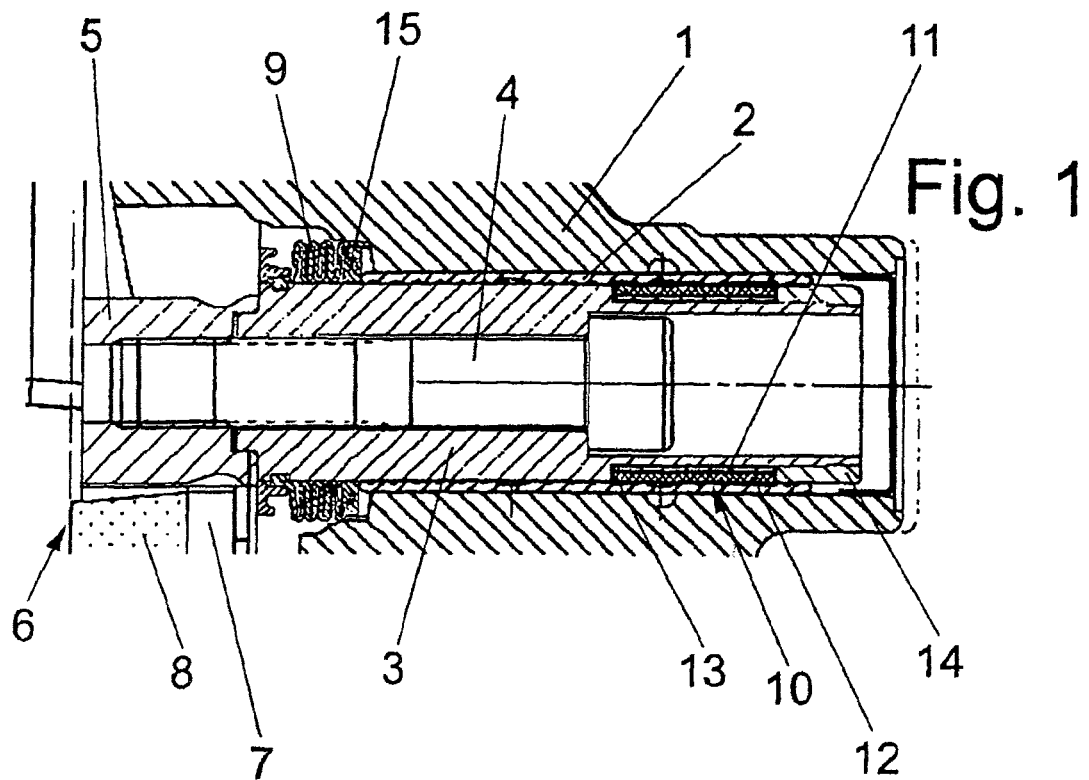
FIG. 1 is a partial-sectional side view of a disc brake according to the invention.
Figure 2:
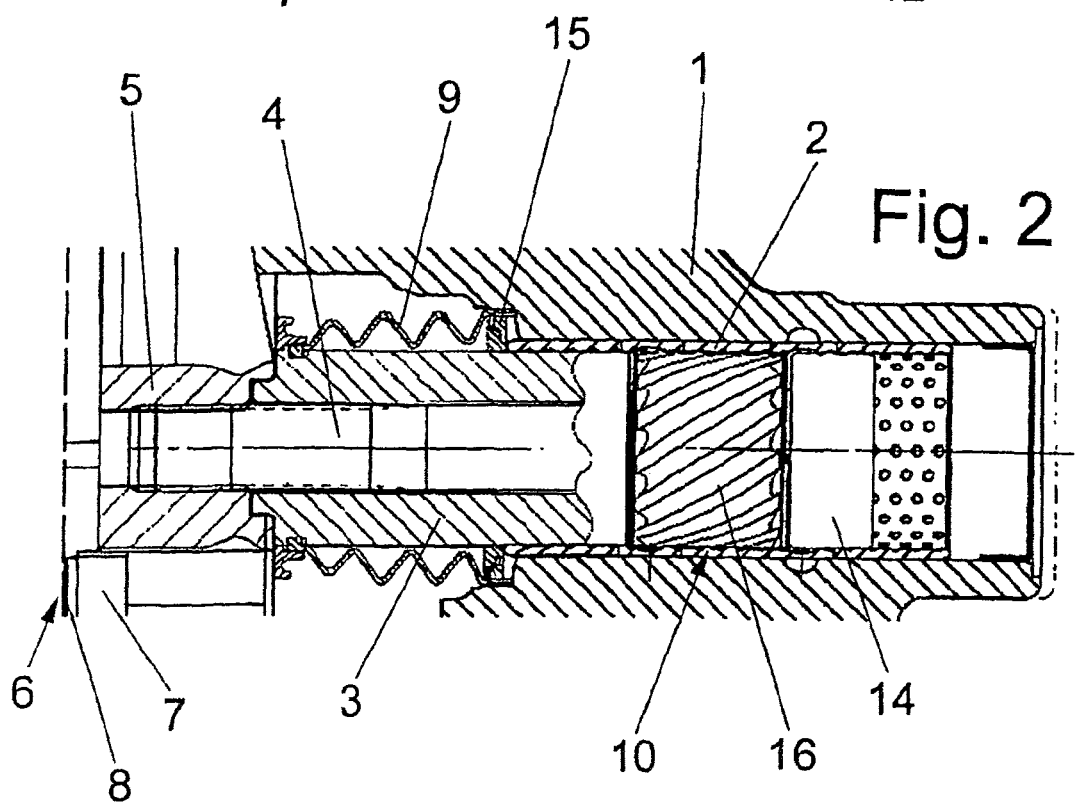
FIG. 2 is a view according to FIG. 1, in a partially sectioned side view.
Figure 3:
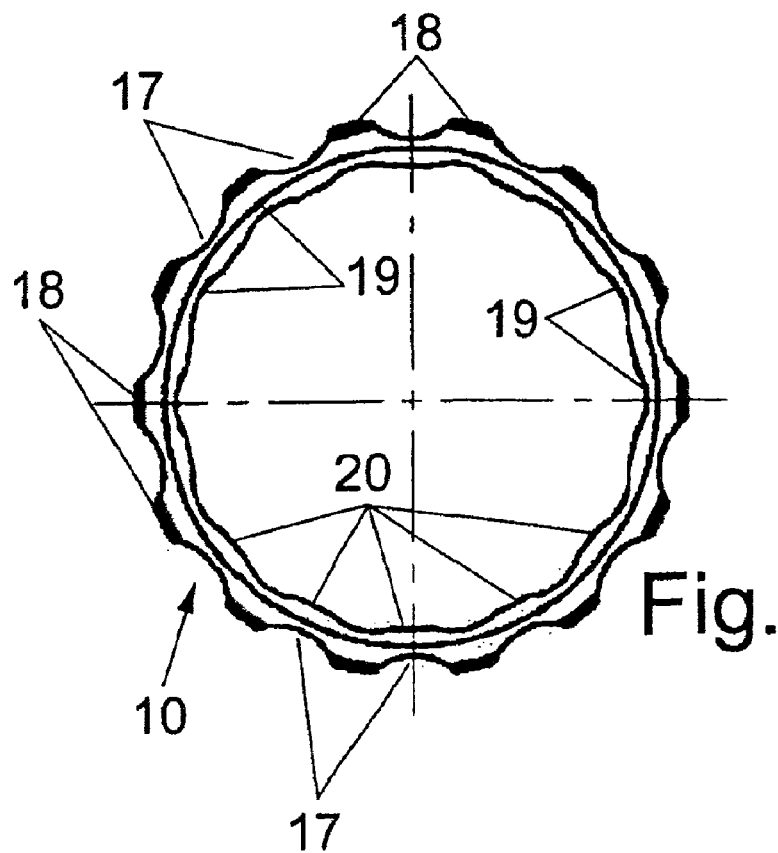
FIG. 3 shows a detail of the disc brake in a plan view.
Figure 4:
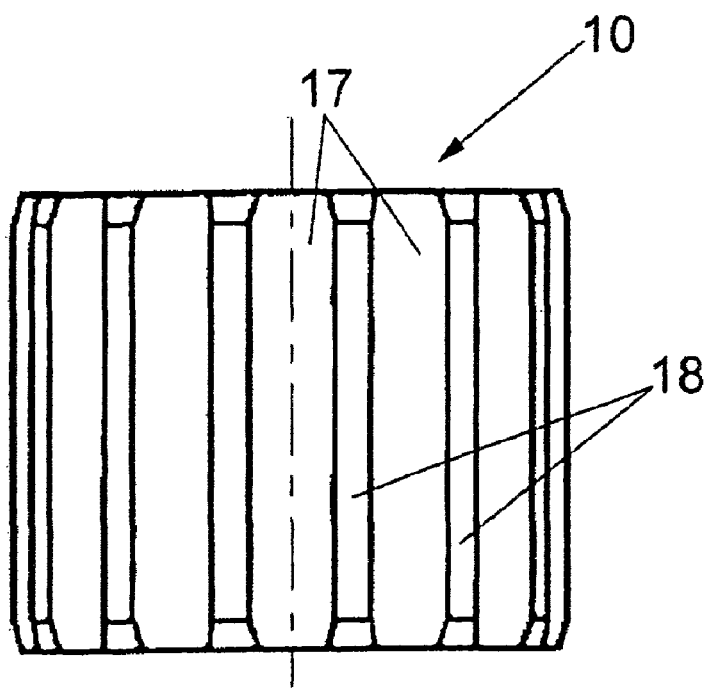
FIG. 4 shows the detail of the disc brake in a side view.
Figure 5:
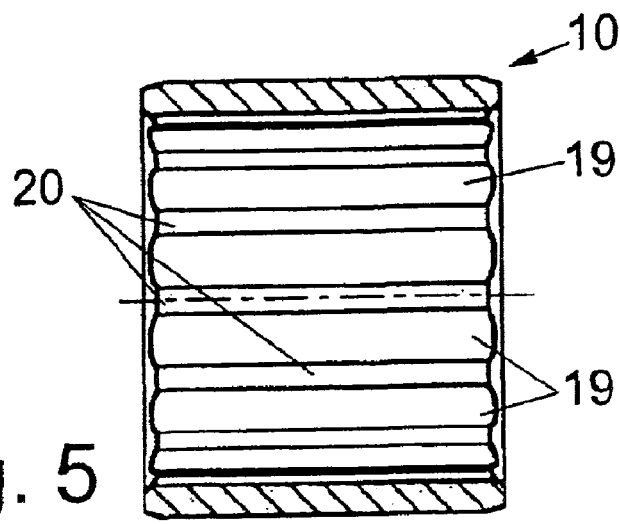
FIG. 5 shows the detail of the disc brake in a sectional side view.

FIG. 1 shows a part of the disc brake with an unused brake pad 6, which is composed of a lining carrier plate 7 and a friction lining material 8 connected thereto. The friction lining material is shown having its maximum thickness. In FIG. 2, in contrast, the friction lining material 8 can be seen to be largely worn down.

The guide spar 3 is mounted in a tubular receptacle of the caliper 1, which tubular receptacle has, as a sliding bearing, a guide sleeve 2 composed of a suitable material. The guide sleeve 2 is connected fixedly to the caliper 1 and slides on the guide spar 3. Otherwise, the guide spar 3 is screwed to the brake carrier 5 by use of a threaded connector such as a bolt or screw 4.

The guide spar 3 of the illustrated fixed bearing has, on an outer circumference, a radially elastically deformable section, which includes a damping bush 10 in the example.

In this example, the damping bush 10 is formed from a metal sleeve 11 forming a carrier and an elastic layer 12 fastened to the outside of the metal sleeve. For example, the elastic layer may be made from a rubber and pressed together with the metal sleeve.

The damping bush 10 is pushed onto a projection of the guide spar 3 from the side which faces away from the brake pad 6, which projection is delimited by a circumferential shoulder 13, with which the damping bush 10 comes into contact.

A closure ring 14 is connected, for example by screwing, to the free end of the projection. The closure ring 14 likewise forms a stop for the damping bush 10 with its end side which faces the damping bush 10. The spacing between the shoulder 13 and the end side of the closure ring 14 is preferably somewhat greater than the width of the damping bush 10, with the result being that the damping bush 10 is guided on the guide spar 3 with an amount of axial play. The amount of play preferably corresponds to half the air play, that is to say working stroke of the disc brake.

In normal braking operation, the sliding bearing or the guide sleeve 2 slides on the elastic layer 12. In the case of greater braking moments to be absorbed, the elastic layer 12 is deformed, with the result that contact is produced otherwise between the guide sleeve 2 and the guide spar 3.

FIG. 2 shows the layer 12 in unsectioned form, with the result that its circumferential face, which is provided with lubricating grooves 16, can be seen here.

As a result of the properties of the elastic layer 12, the damping bush 10 prevents rattling noise during driving operation of the vehicle, to which a damping ring 15 likewise contributes, which is preferably also composed of an elastic material.

The damping ring 15 is provided at the end region of the guide spar 3 facing the brake pad 6, and is housed in the direction of the brake pad 6 by a folding bellows 9. The folding bellows 9 shields the guide sleeve 2 with respect to the interior of the disc brake and is fastened on one side to the guide spar 3 and on the other side to the caliper 1.

While the folding bellows 9 can be seen to be compressed in FIG. 1 with an unworn brake pad 6, it is shown extended in FIG. 2 with a worn brake pad 6, according to the displacement travel of the caliper 1.

Figure 6:
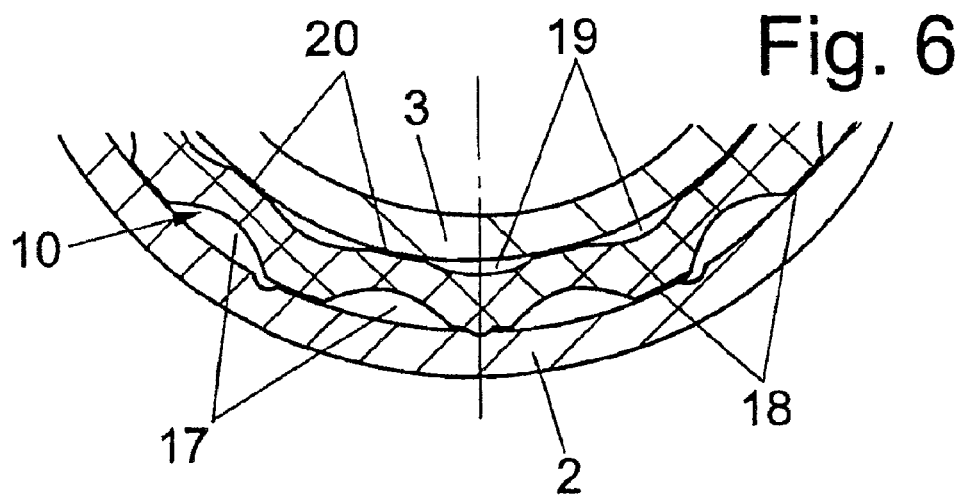
FIGS. 6 and 7 in each case show portions of the detail of the disc brake in different functional positions.
Figure 7:
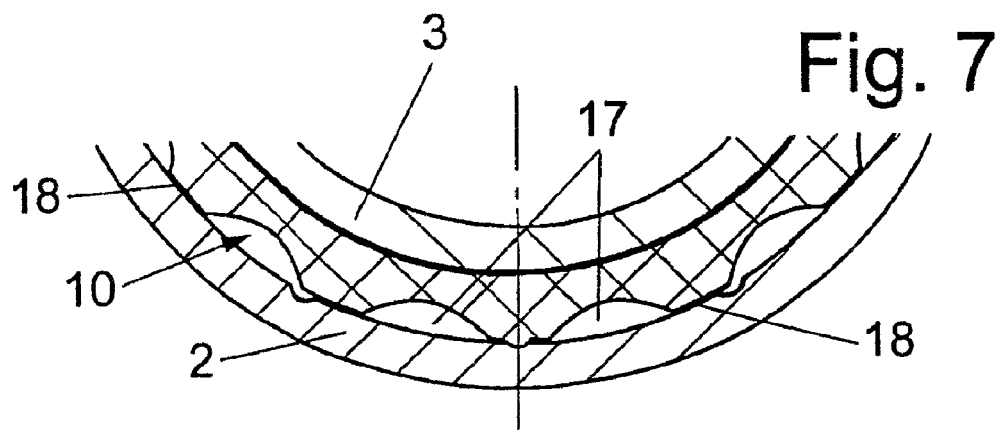

In FIGS. 3 to 7, a further exemplary embodiment of the damping bush 10 can be seen which has, on its outer circumferential face, a multiplicity of uniformly distributed, equally large grooves 17, which extend axially over the entire length of the damping bush 10 and are delimited in each case by webs 18 which form a contact face for contact with the guide sleeve 2 (FIGS. 6 and 7).

The inner side of the damping bush 10 is likewise provided with grooves which have the designation 19 and likewise extend axially over the entire length of the damping bush 10. In the example, the grooves 19 have an equally large width and are distributed at the same spacing over the inner face. The grooves 19 are delimited by webs 20 which are supported on the guide spar 3.

The inner grooves 19 are arranged in the overlap region of the outer webs 18 and have a smaller width than the outer grooves 17, the center axes of which lie on a radial plane with the center axes of the outer grooves 17, just like the outer webs 18 extend with their center longitudinal axes on a radial plane with the center longitudinal axes of the inner grooves 19.

FIG. 6 shows a position, in which the damping bush 10 is not loaded radially. It can be seen that the width of the inner grooves 19, which are arcuate in cross section, is smaller than the width of the likewise arcuate outer grooves 17, the curvature radius of the inner grooves 19 and the outer grooves 17 being identical, but in contrast the depth being different, which results in a different width.

Since, as a result, the thickness of the damping bush, which can otherwise be composed of an elastomer, is greater in the region of the outer webs 18 and the inner grooves 19 than the thickness in the region of the outer grooves 17 and the inner webs 20, this leads to a different progression characteristic, that is to say to a different deformation of the damping bush 10, according to the illustration in FIG. 7.

Here, on account of active radial forces, the damping bush 10 is deformed in such a way that the inner webs 20 and the adjacent inner grooves 19 form a virtually uniformly curved surface area.

TABLE OF REFERENCE NUMERALS

1 Caliper
2 Guide sleeve
3 Guide spar
4 Threaded Connector (screw or bolt)
5 Brake carrier
6 Brake pad
7 Lining carrier plate
8 Friction lining material
9 Folding bellows
10 Damping bush
11 Metal sleeve
12 Layer
13 Shoulder
14 Closure ring
15 Damping ring
16 Lubricating groove The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, comprising:
a caliper which straddles the brake disc in use;
a brake carrier;
two fastening elements operably configured to fasten the caliper to the brake carrier so as to be axially displaceable relative to the brake disc, each fastening element having a guide spar fixedly connected to the brake carrier, one guide spar of one fastening element being guided in a sliding bearing configured as a floating bearing and another guide spar of another fastening element being guided in a sliding bearing configured as a fixed bearing;
wherein the one guide spar of the fixed bearing comprises, on an outer circumference thereof, a radially elastically deformable section against which the associated sliding bearing bears at least in one or more regions;
wherein the elastically deformable section is formed from a rubber damping bush;
wherein the rubber damping bush has, on an inner and an outer side, grooves which are delimited on both sides by webs; and
wherein widths of the inner grooves are smaller than widths of the outer grooves.

2. The disc brake as claimed in claim 1, wherein the damping bush is guided on a projection of the guide spar.

3. The disc brake as claimed in claim 2, wherein the projection of the guide spar is delimited by a circumferential shoulder.

4. The disc brake as claimed in claim 3, wherein the shoulder forms a movement stop for the damping bush.

5. The disc brake as claimed in claim 4, wherein the damping bush has a progressive damping characteristic in a radial loading direction.

6. The disc brake as claimed in claim 2, wherein a closure ring is fixed at an end of the guide spar facing away from the brake disc, one end side of the closure ring forming a movement stop for the damping bush.

7. The disc brake as claimed in claim 6, wherein a spacing between the shoulder and the facing end side of the closure ring is greater than the width of the damping bush.

8. The disc brake as claimed in claim 7, wherein a play, which is formed by the greater spacing between the shoulder and the closure ring, in relation to the width of the damping bush, corresponds approximately to half the air play.

9. The disc brake as claimed in claim 6, wherein a damping ring composed of a damping material is arranged at an end region of the guide spar facing the brake disc.

10. The disc brake as claimed in claim 9, wherein the damping ring is arranged in an interior of a folding bellows, which is fastened on one side to the guide spar and on the other side to the caliper.

11. The disc brake as claimed in claim 1, wherein at least one part of the webs is at least one of thicker, wider, and at a different spacing from another part.

12. The disc brake as claimed in claim 11, wherein the webs extend one of axially, circumferentially, and diagonally.

13. The disc brake as claimed in claim 1, wherein the grooves extend over an entire axial length of the damping bush.

14. The disc brake as claimed in claim 1, wherein a thickness of the damping bush in a region of the outer webs and the associated inner grooves is different than the thickness in the region of the outer grooves and the associated inner webs.

15. The disc brake as claimed in claim 1, wherein a center longitudinal axis of each outer web and a center longitudinal axis of an associated inner groove lie in a common radial plane, and a center longitudinal axis of each outer groove and a center longitudinal axis of an associated inner web lie in a common radial plane.

16. The disc brake as claimed in claim 1, wherein the widths of the outer grooves are identical, and the widths of the inner grooves are identical.

17. The disc brake as claimed in claim 1, wherein the webs form contact faces for the sliding bearing and the guide spar.

18. The disc brake as claimed in claim 1, wherein the outer grooves and the inner grooves extend at an identical angular spacing from one another.

19. The disc brake as claimed in claim 1, wherein the damping bush has a progressive damping characteristic in a radial loading direction.

20. The disc brake as claimed in claim 19, wherein the progressive damping characteristic differs over part regions.

21. The disc brake as claimed in claim 1, wherein the outer grooves of the damping bush are configured as lubricating grooves.

22. A disc brake having a brake disc, comprising:

a caliper which straddles the brake disc in use;

a brake carrier;

two fastening elements operably configured to fasten the caliper to the brake carrier so as to be axially displaceable relative to the brake disc, each fastening element having a guide spar fixedly connected to the brake carrier, one guide spar of one fastening element being guided in a sliding bearing configured as a floating bearing and another guide spar of another fastening element being guided in a sliding bearing configured as a fixed bearing;

wherein the one guide spar of the fixed bearing comprises, on an outer circumference thereof, a radially elastically deformable section against which the associated sliding bearing bears at least in one or more regions;

wherein the elastically deformable section is formed from a damping bush which has, on an inner and an outer side, grooves which are delimited on both sides by webs; and wherein the outer grooves and the inner grooves have an arcuate cross-section.

23. The disc brake as claimed in claim 22, wherein the cross-sectional radius of the inner grooves and the outer grooves is identical.

* * * * *